US010805501B2

(12) United States Patent
Berman (10) Patent No.: US 10,805,501 B2
(45) Date of Patent: Oct. 13, 2020

(54) CONVERTING BIOMETRIC DATA INTO TWO-DIMENSIONAL IMAGES FOR USE IN AUTHENTICATION PROCESSES

(71) Applicant: PAYPAL, INC., San Jose, CA (US)

(72) Inventor: Zachary Joseph Berman, San Jose, CA (US)

(73) Assignee: PAYPAL, INC., San Jose, CA (US)

(*) Notice: Subject to any disclaimer, the term of this patent is extended or adjusted under 35 U.S.C. 154(b) by 188 days.

(21) Appl. No.: 15/856,732

(22) Filed: Dec. 28, 2017

(65) Prior Publication Data
US 2019/0208076 A1 Jul. 4, 2019

(51) Int. Cl.
- *G06F 21/32* (2013.01)
- *H04N 1/32* (2006.01)
- *H04L 9/32* (2006.01)
- *G06K 9/00* (2006.01)

(52) U.S. Cl.
CPC ......... *H04N 1/32283* (2013.01); *G06F 21/32* (2013.01); *G06K 9/00248* (2013.01); *H04L 9/3231* (2013.01); *H04L 9/3236* (2013.01); *H04N 2201/3236* (2013.01)

(58) Field of Classification Search
CPC ........ H04N 1/32283; H04N 2201/3236; G06F 21/32; G06K 9/00248; H04L 9/3231; H04L 9/3236
See application file for complete search history.

(56) References Cited

U.S. PATENT DOCUMENTS

| | | | | |
|---|---|---|---|---|
| 7,114,079 | B1* | 9/2006 | Cook | G07C 9/257 713/186 |
| 7,809,172 | B2* | 10/2010 | Lubow | B42D 25/00 382/118 |
| 2009/0185746 | A1* | 7/2009 | Mian | G06K 9/00268 382/209 |
| 2011/0102141 | A1* | 5/2011 | Wu | G06Q 20/40145 340/5.82 |

\* cited by examiner

*Primary Examiner* — Olugbenga O Idowu
(74) *Attorney, Agent, or Firm* — Haynes and Boone, LLP (57) ABSTRACT

Methods and systems for converting biometric data into two-dimensional images for use in authentication processes are described. Biometric data is received and then hashed into a string of characters. A 2-D image is created based on the hashed string of characters. The 2-D image is then provided for printing on a personal transaction card.

20 Claims, 6 Drawing Sheets

CONVERTING BIOMETRIC DATA INTO TWO-DIMENSIONAL IMAGES FOR USE IN AUTHENTICATION PROCESSES

TECHNICAL FIELD

The subject technology generally relates to user authentication of physical credit cards and more particularly, relates to a system and method that converts biometric data into two-dimensional (2-D) images that is used in authentication processes.

BACKGROUND

Credit cards are a popular form of payment for purchases made in-store, and are used almost exclusively for online purchases. Given the widespread use, credit cards are also a major target for theft and fraud. Many different security measures have been taken to reduce the amount of fraud over the years. For example, credit cards include a signature panel on the back so that merchants can compare signatures on a receipt with that which is on the credit card. Holograms have also been used to indicate the authenticity of the card. Furthermore, credit cards have magnetic stripes on which an assortment of information may be included, such as the credit card number, name of cardholder, and the card's expiration date and country code. More recently, credit cards have incorporated EuroPay, MasterCard and Visa (EMV) chips. These chips are designed to add a layer of security over magnetic stripe by turning the cardholder's information into a unique code when used at a chip-enabled terminal that is difficult to duplicate or copy.

While numerous technologies have been implemented to enhance the security of credit cards, bad actors have developed techniques to circumvent each of them. Accordingly, additional novel credit card security measures must continue to be developed. One form of authentication that has proven particularly useful across industries is authentication via biometrics. However, incorporating biometrics for credit card purchases in the convention manner may require back-end infrastructure that merchants may not be willing to implement. Furthermore, using biometrics typically requires connectivity from the merchant to a central server where the biometric authentication data is stored. Accordingly, an approach to using biometrics without relying on connecting to a central authentication system may be desirable.

SUMMARY

According to various aspects of the subject technology, a system for converting biometric data into two-dimensional images for use in authentication processes is provided. Biometric data is received and then hashed into a string of characters. A 2-D image is created based on the hashed string of characters. The 2-D image is then provided for printing on a personal transaction card.

According to various aspects of the subject technology, a method for authenticating a cardholder based on a 2-D image is described. A personal transaction card is scanned to detect a 2-D image. The 2-D image is decoded into a first string of characters. Biometric data is then scanned and hashed into a second string of characters. The first string of characters is compared to the second string of characters. The transaction is authenticated if a match between the first and second strings of characters is determined.

According to various aspects of the subject technology, a non-transitory machine-readable medium having stored thereon machine-readable instructions executable to convert biometric data into two-dimensional images for use in authentication processes is described. Biometric data corresponding to a scan of facial features of an individual is received and normalized. The normalized biometric data is then hashed into a string of characters. A 2-D image is created based on the hashed string of characters and provided for printing on a personal transaction card.

Additional features and advantages of the subject technology will be set forth in the description below, and in part will be apparent from the description, or may be learned by practice of the subject technology. The advantages of the subject technology will be realized and attained by the structure particularly pointed out in the written description and claims hereof as well as the appended drawings.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide further understanding of the subject technology and are incorporated in and constitute a part of this specification, illustrate aspects of the subject technology and together with the description serve to explain the principles of the subject technology.

DETAILED DESCRIPTION

Many of today's credit card transactions are made in person with the presentation of a physical card that either has its magnetic stripe swiped by or EMV chip inserted into a machine. While some merchants require either match a user's signature to that of the signature panel on the card, or require identification from the user, neither practice is fool proof or used consistently. As such, there's a tremendous opportunity for fraud to be committed. It is not uncommon for credit cards to be stolen and presented as one's own to make a purchase before the rightful owner has taken action to cancel the card. Additionally, it's possible for more sophisticated fraudsters to use a skimmer to grab a copy of the data on the magnetic strip, and create a duplicate card to be used.

One way to increase the security of credit cards we use today is to hash certain biometric data, convert the hashed data into a 2-D image, and embedding the image onto the physical credit card. Thus, when the credit card is presented at a merchant, the 2-D image can be scanned by a machine and decoded to the hashed value. The biometric feature of the user of the card is scanned by the machine, hashed, and then compared to the hash decoded from the card. The user is then authenticated based on the comparison. By using this technique, the biometric features, which are mostly immutable, can be used to authenticate a user of a credit card without creating undue friction from requiring the user to present identification (e.g., driver's license) or to sign a receipt.

This specification includes references to "one embodiment," "some embodiments," or "an embodiment." The appearances of these phrases do not necessarily refer to the same embodiment. Particular features, structures, or characteristics may be combined in any suitable manner consistent with this disclosure.

"First," "Second," etc. As used herein, these terms are used as labels for nouns that they precede, and do not necessarily imply any type of ordering (e.g., spatial, temporal, logical, cardinal, etc.). Furthermore, various components may be described or claimed as "configured to" perform a task or tasks. In such contexts, "configured to" is used to connote structure by indicating that the components include structure (e.g., stored logic) that performs the task or tasks during operation. As such, the component can be said to be configured to perform the task even when the component is not currently operational (e.g., is not on). Reciting that a component is "configured to" perform one or more tasks is expressly intended not to invoke 35 U.S.C. § 112(f) for that component.

Figure 1:
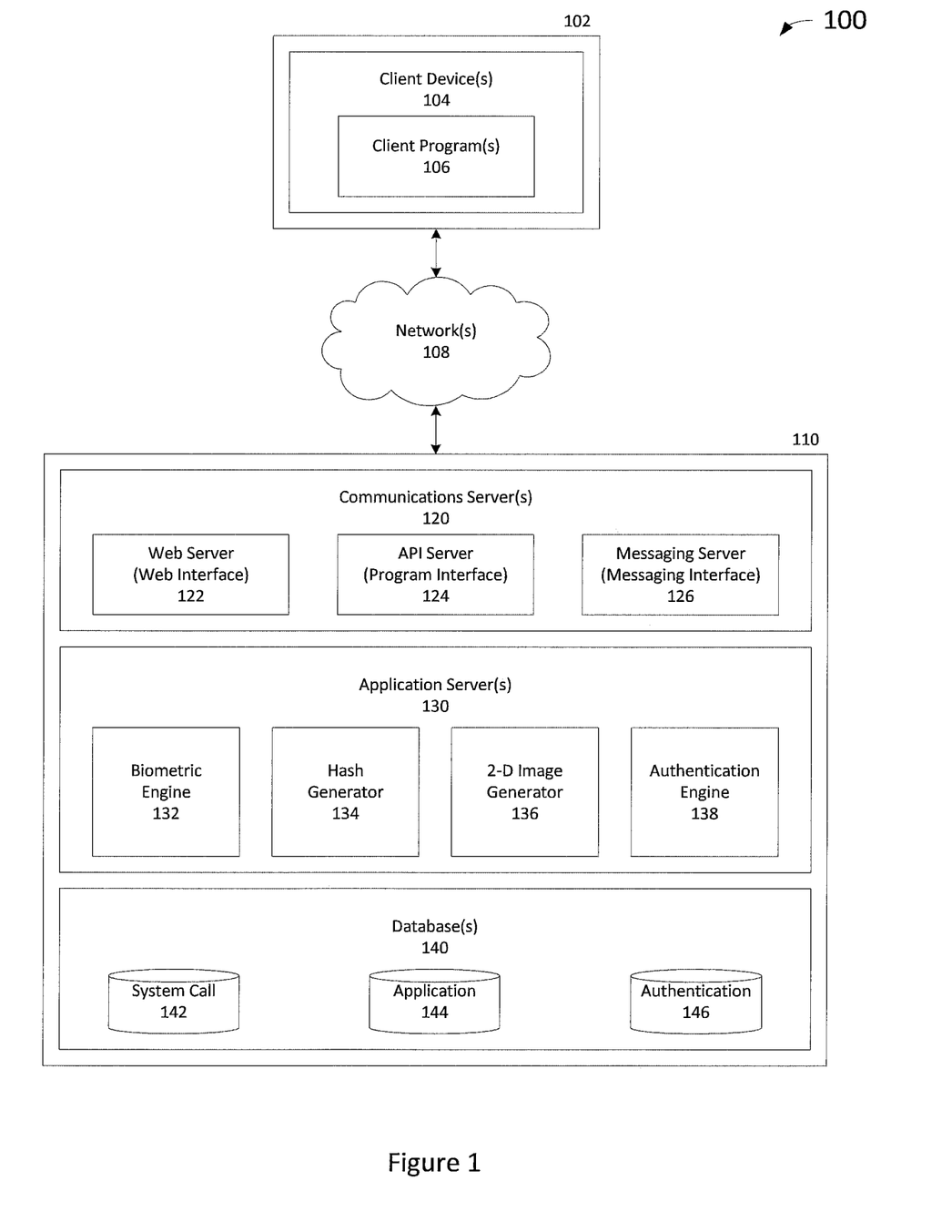
FIG. 1 is a block diagram of an exemplary computing system on which a conversion of biometric data into a 2-D image for use in an authentication process is implemented.

FIG. 1 illustrates an exemplary embodiment of a computing system adapted for implementing one or more embodiments disclosed herein to authenticate a user using middle ear biometric measurements. As shown, a computing system 100 may comprise or implement a plurality of servers, devices, and/or software components that operate to perform various methodologies in accordance with the described embodiments. Exemplary servers, devices, and/or software components may include, for example, stand-alone and enterprise-class servers running an operating system (OS) such as a MICROSOFT® OS, a UNIX® OS, a LINUX® OS, or other suitable OS. It may be appreciated that the servers illustrated in FIG. 1 may be deployed in other ways and that the operations performed and/or the services provided by such servers may be combined, distributed, and/or separated for a given implementation and may be performed by a greater number or fewer number of servers. One or more servers may be operated and/or maintained by the same or different entities.

Computing system 100 may include, among various devices, servers, databases and other elements, one or more clients 102 comprising or employing one or more client devices 104, such as a laptop, a mobile computing device, a tablet, a personal computer, a wearable device, and/or any other computing device having computing and/or communications capabilities in accordance with the described embodiments. Client devices 104 may include a cellular telephone, smart phone, electronic wearable device (e.g., smart watch, virtual reality headset), or other similar mobile devices that a user may carry on or about his or her person and access readily.

Client devices 104 generally may provide one or more client programs 106, such as system programs and application programs to perform various computing and/or communications operations. Exemplary system programs may include, without limitation, an operating system (e.g., MICROSOFT® OS, UNIX® OS, LINUX® OS, Symbian OS™, iOS, Android, Embedix OS, Binary Run-time Environment for Wireless (BREW) OS, JavaOS, a Wireless Application Protocol (WAP) OS, and others), device drivers, programming tools, utility programs, software libraries, application programming interfaces (APIs), and so forth. Exemplary application programs may include, without limitation, a payment system application, a web browser application, messaging application, contacts application, calendar application, electronic document application, database application, media application (e.g., music, video, television), location-based services (LBS) application (e.g., GPS, mapping, directions, positioning systems, geolocation, point-of-interest, locator) that may utilize hardware components such as an antenna, and so forth. One or more of client programs 106 may display various graphical user interfaces (GUIs) to present information to and/or receive information from one or more users of client devices 104. In some embodiments, client programs 106 may include one or more applications configured to conduct some or all of the functionalities and/or processes discussed below.

As shown, client devices 104 may be communicatively coupled via one or more networks 108 to a network-based system 110. Network-based system 110 may be structured, arranged, and/or configured to allow client 102 to establish one or more communications sessions between network-based system 110 and various client devices 104 and/or client programs 106. Accordingly, a communications session between client devices 104 and network-based system 110 may involve the unidirectional and/or bidirectional exchange of information and may occur over one or more types of networks 108 depending on the mode of communication. While the embodiment of FIG. 1 illustrates a computing system 100 deployed in a client-server operating environment, it is to be understood that other suitable operating environments and/or architectures may be used in accordance with the described embodiments.

Data communications between client devices 104 and the network-based system 110 may be sent and received over one or more networks 108 such as the Internet, a WAN, a WWAN, a WLAN, a mobile telephone network, a landline telephone network, personal area network, as well as other suitable networks. For example, client devices 104 may communicate with network-based system 110 over the Internet or other suitable WAN by sending and or receiving information via interaction with a website, e-mail, IM session, and/or video messaging session. Any of a wide variety of suitable communication types between client devices 104 and system 110 may take place, as will be readily appreciated. In particular, wireless communications of any suitable form (e.g., Bluetooth, near-field communication, etc.) may take place between client device 104 and system 110, such as that which often occurs in the case of mobile phones or other personal and/or mobile devices.

Network-based system 110 may comprise one or more communications servers 120 to provide suitable interfaces that enable communication using various modes of communication and/or via one or more networks 108. Communications servers 120 may include a web server 122, an API server 124, and/or a messaging server 126 to provide interfaces to one or more application servers 130. Application servers 130 of network-based system 110 may be structured, arranged, and/or configured to provide various online services to client devices that communicate with network-based system 110. In various embodiments, client devices 104 may communicate with application servers 130 of network-based system 110 via one or more of a web interface provided by web server 122, a programmatic interface provided by API server 124, and/or a messaging interface provided by messaging server 126. It may be appreciated that web server 122, API server 124, and messaging server 126 may be structured, arranged, and/or configured to communicate with various types of client devices 104, and/or client programs 106 and may interoperate with each other in some implementations.

Web server 122 may be arranged to communicate with web clients and/or applications such as a web browser, web browser toolbar, desktop widget, mobile widget, web-based application, web-based interpreter, virtual machine, mobile applications, and so forth. API server 124 may be arranged to communicate with various client programs 106 comprising an implementation of API for network-based system 110. Messaging server 126 may be arranged to communicate with various messaging clients and/or applications such as e-mail, IM, SMS, MMS, telephone, VoIP, video messaging, IRC, and so forth, and messaging server 126 may provide a messaging interface to enable access by client 102 to the various services and functions provided by application servers 130.

Application servers 130 of network-based system 110 may be servers that provide various services to client devices, such as tools for authenticating users and associated libraries. Application servers 130 may include multiple servers and/or components. For example, application servers 130 may include a challenge biometric engine 132, has generator 134, 2-D image generator 136, and/or authentication engine 138. These servers and/or components, which may be in addition to other servers, may be structured and arranged to identify those webpages that malicious content.

Application servers 130, in turn, may be coupled to and capable of accessing one or more databases 140 including system call database 142, application database 144, and/or authentication database 146. Databases 140 generally may store and maintain various types of information for use by application servers 130 and may comprise or be implemented by various types of computer storage devices (e.g., servers, memory) and/or database structures (e.g., relational, object-oriented, hierarchical, dimensional, network) in accordance with the described embodiments.

Figure 2:
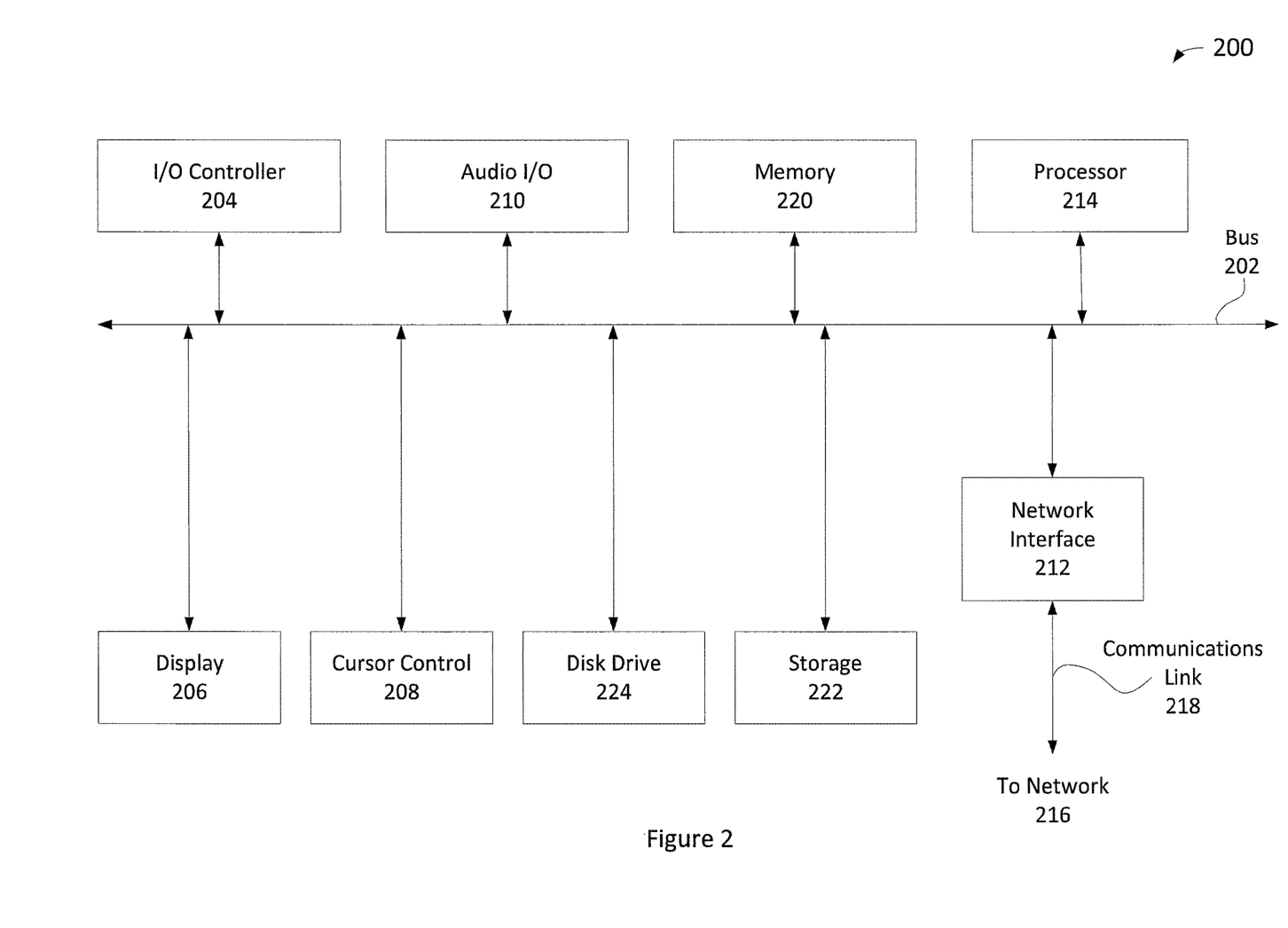
FIG. 2 is a block diagram of an exemplary computer system suitable for implementing one or more devices of the computing system in FIG. 1.

FIG. 2 illustrates an exemplary computer system 200 in block diagram format suitable for implementing on one or more devices of the computing system in FIG. 1. In various implementations, a device that includes computer system 200 may comprise a personal computing device (e.g., a smart or mobile phone, a computing tablet, a personal computer, laptop, wearable device, PDA, etc.) that is capable of communicating with a network. A service provider and/or a content provider may utilize a network computing device (e.g., a network server) capable of communicating with the network. It should be appreciated that each of the devices utilized by users, service providers, and content providers may be implemented as computer system 200 in a manner as follows. Additionally, as more and more devices become communication capable, such as smart devices using wireless communication to report, track, message, relay information and so forth, these devices may be part of computer system 200.

Computer system 200 may include a bus 202 or other communication mechanisms for communicating information data, signals, and information between various components of computer system 200. Components include an input/output (I/O) controller 204 that processes a user action, such as selecting keys from a keypad/keyboard, selecting one or more buttons, links, actuatable elements, etc., and sends a corresponding signal to bus 202. I/O controller 204 may also include an output component, such as a display 206 and a cursor control 208 (such as a keyboard, keypad, mouse, touchscreen, etc.). In some examples, I/O controller 204 may include an image sensor for capturing images and/or video, such as a complementary metal-oxide semiconductor (CMOS) image sensor, and/or the like. An audio I/O component 210 may also be included to allow a user to use voice for inputting information by converting audio signals. Audio I/O component 210 may allow the user to hear audio.

A transceiver or network interface 212 transmits and receives signals between computer system 200 and other devices, such as another user device, a merchant server, an email server, application service provider, web server, a payment provider server, and/or other servers via a network. In various embodiments, such as for many cellular telephone and other mobile device embodiments, this transmission may be wireless, although other transmission mediums and methods may also be suitable. A processor 214, which may be a micro-controller, digital signal processor (DSP), or other processing component, processes these various signals, such as for display on computer system 200 or transmission to other devices over a network 216 via a communication link 218. Again, communication link 218 may be a wireless communication in some embodiments. Processor 214 may also control transmission of information, such as cookies, IP addresses, images, and/or the like to other devices.

Components of computer system 200 also include a system memory 220 (e.g., RAM), a static storage component 222 (e.g., ROM), and/or a disk drive 224. Computer system 200 performs specific operations by processor 214 and other components by executing one or more sequences of instructions contained in system memory 220. Logic may be encoded in a computer-readable medium, which may refer to any medium that participates in providing instructions to processor 214 for execution. Such a medium may take many forms, including but not limited to, non-volatile media, volatile media, and/or transmission media. In various implementations, non-volatile media includes optical or magnetic disks, volatile media includes dynamic memory such as system memory 220, and transmission media includes coaxial cables, copper wire, and fiber optics, including wires that comprise bus 202. In one embodiment, the logic is encoded in a non-transitory machine-readable medium. In one example, transmission media may take the form of acoustic or light waves, such as those generated during radio wave, optical, and infrared data communications.

Some common forms of computer readable media include, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, or any other medium from which a computer is adapted to read.

In various embodiments of the present disclosure, execution of instruction sequences to practice the present disclosure may be performed by computer system 200. In various other embodiments of the present disclosure, a plurality of computer systems 200 coupled by communication link 218 to the network (e.g., such as a LAN, WLAN, PTSN, and/or various other wired or wireless networks, including telecommunications, mobile, and cellular phone networks) may perform instruction sequences to practice the present disclosure in coordination with one another. Modules described herein may be embodied in one or more computer readable media or be in communication with one or more processors to execute or process the techniques and algorithms described herein.

A computer system may transmit and receive messages, data, information and instructions, including one or more programs (i.e., application code) through a communication link and a communication interface. Received program code may be executed by a processor as received and/or stored in a disk drive component or some other non-volatile storage component for execution.

Where applicable, various embodiments provided by the present disclosure may be implemented using hardware, software, or combinations of hardware and software. Also, where applicable, the various hardware components and/or software components set forth herein may be combined into composite components comprising software, hardware, and/or both without departing from the spirit of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa.

Software, in accordance with the present disclosure, such as program code and/or data, may be stored on one or more computer-readable media. It is also contemplated that software identified herein may be implemented using one or more computers and/or computer systems, networked and/or otherwise. Such software may be stored and/or used at one or more locations along or throughout the system, at client 102, network-based system 110, or both. Where applicable, the ordering of various steps described herein may be changed, combined into composite steps, and/or separated into sub-steps to provide features described herein.

The foregoing networks, systems, devices, and numerous variations thereof may be used to implement one or more services, such as the services discussed above and in more detail below.

Figure 3:
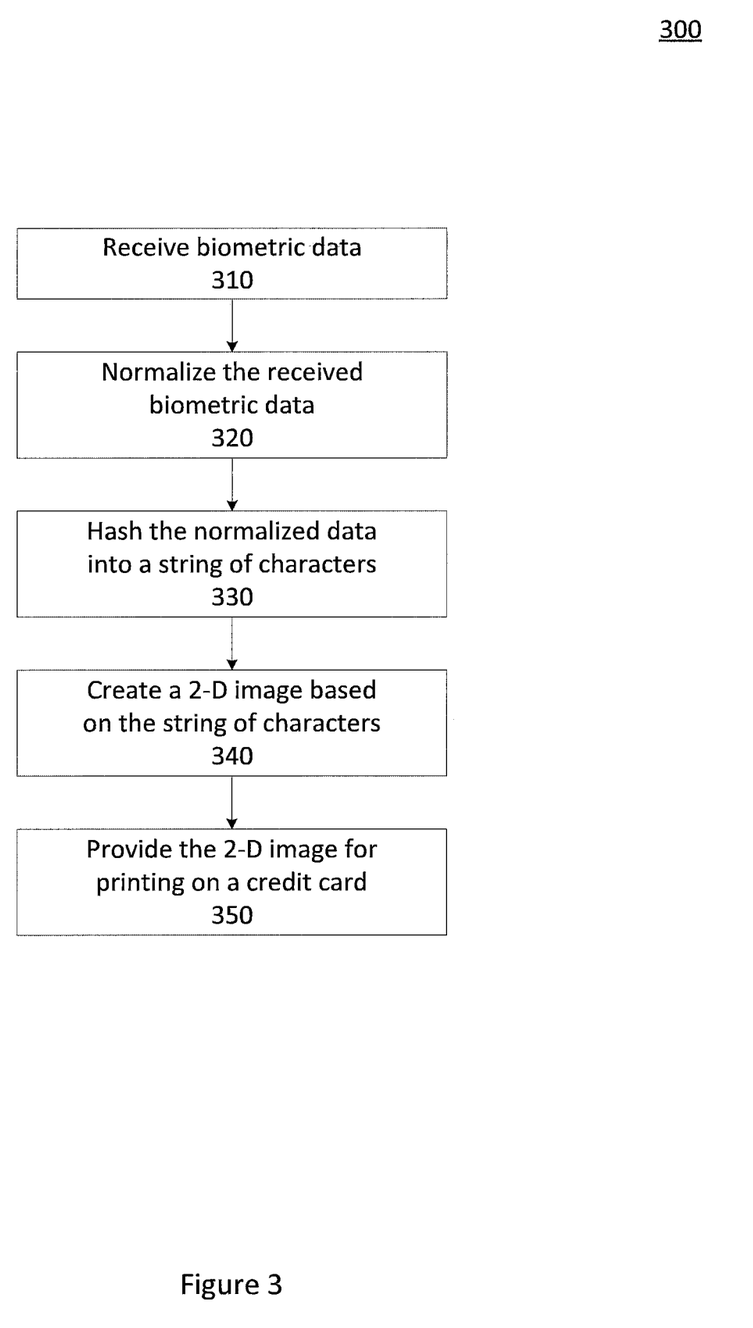
FIG. 3 illustrates an exemplary process 300 for converting biometric data into a 2-D image for use in an authentication process.

FIG. 3 illustrates an exemplary process 300 for converting biometric data into a 2-D image for use in an authentication process. At operation 310, the system receives biometric data. In a preferred embodiment, facial features are received either from a database of scans or from a three-dimensional (3-D) sensor. In alternative embodiments, other biometric features such as fingerprints and middle ear scans may be used.

At operation 320, the biometric data is normalized after being received. For example, the received biometric data may include information about the shape of a face captured by 3-D sensors. Normalizing this data includes identifying distinctive features on the surface of a face, such as the contour of the eye sockets, nose, and chin, while stripping out noise. Normalization also helps minimize the effect of any changes in lighting between different captures of the face. Normalizing the data can further enable identification of a face from different viewing angles.

Once the biometric data has been normalized, the normalized data is hashed into a string of characters in operation 330. The string of characters may represent a set of hash values, each one of the hash values being the result of hashing a subset of the set of minutiae from the 3D mapping of the face (or other biometric measurement). In one embodiment, localized triplets (or small sets) of "minutiae" (defined as a point of interest on the 3D mapping of the face, can be an eye, nose, mouth, wrinkle, dimple, any other detail) may be hashed to produce a set of several values representing the hash values of localized sets. Given a high enough percentage of correct hashes, a match may be determined. Each individual hash of a localized set of minutiae will be done with Locality-sensitive hashing, which aims to maximize the probability of a hashing "collision" for similar inputs. For example, given a universe of items 'U' that have a similarity function $\phi$: $U \times U \rightarrow [0,1]$, a Locality sensitive hashing scheme is a family of hash functions 'H' coupled with a probability distribution 'D' over the functions such that a function 'h' (an element of H) chosen according to 'D' satisfies the property that [the probability that $h(a)=h(b)]=\phi(a, b)$, for any a, b in U.

The string of characters may then be converted into an image in operation 340. That is, the system can produce a unique, visual representation of the hash, such that a computer can read the image and re-create the hash in memory.

For example, a simple function having 16 different patterns may be used where each is one block in shape/size. A hexadecimal string may then be mapped to a 2D image on the card by mapping each digit in the string to its corresponding block pattern. This will create a square made up of the smaller square patterns. Then the computer can capture the series of patterns and map it back into the original hexadecimal string. The pattern thus would be associated with the shape of the face. Because the pattern is produced based on a string of characters created by a hash function, there will be no noticeable correlation between the shape of the face and the resulting image. The pattern is simply a representation of what the string of characters was previously. Furthermore, because a hash function is used, there is no easy way for anyone to be able to determine what the facial features are from the particular pattern created. Likewise, there's no easy way for an individual to create the particular pattern from facial features without at least having access to the hash function.

In an alternative embodiment, the string of characters may be used as an input for an algorithm that alters a standard picture by adjusting certain features within the picture to produce a resulting image. For example, a known picture such as the Eiffel Tower may be chosen by the cardholder. The system then alters certain pixels of the picture based on the string of characters that is input to produce the resulting image. Alterations to the picture may include changes to a selection of pixels of the image, for example, changes in color, size, etc. Using this type of conversion function provides the user with an option to select a picture to be imaged on the credit card.

Once the 2-D image has been created by the hash function, the image is provided for printing on a credit card, or any other type of card where authentication of a cardholder is required. Whether it's the pattern based image or the altered version of the preselected picture image, the 2-D image may be printed on the face of the credit card. In some instances, there may be a designated area on the credit card on which the image may be printed, e.g., one corner of the card, or a predefined section of the card. Alternatively, the image may be printed on the entire face of the card. Also, the image may be printed on the front and/or the back of the card.

Figure 4:
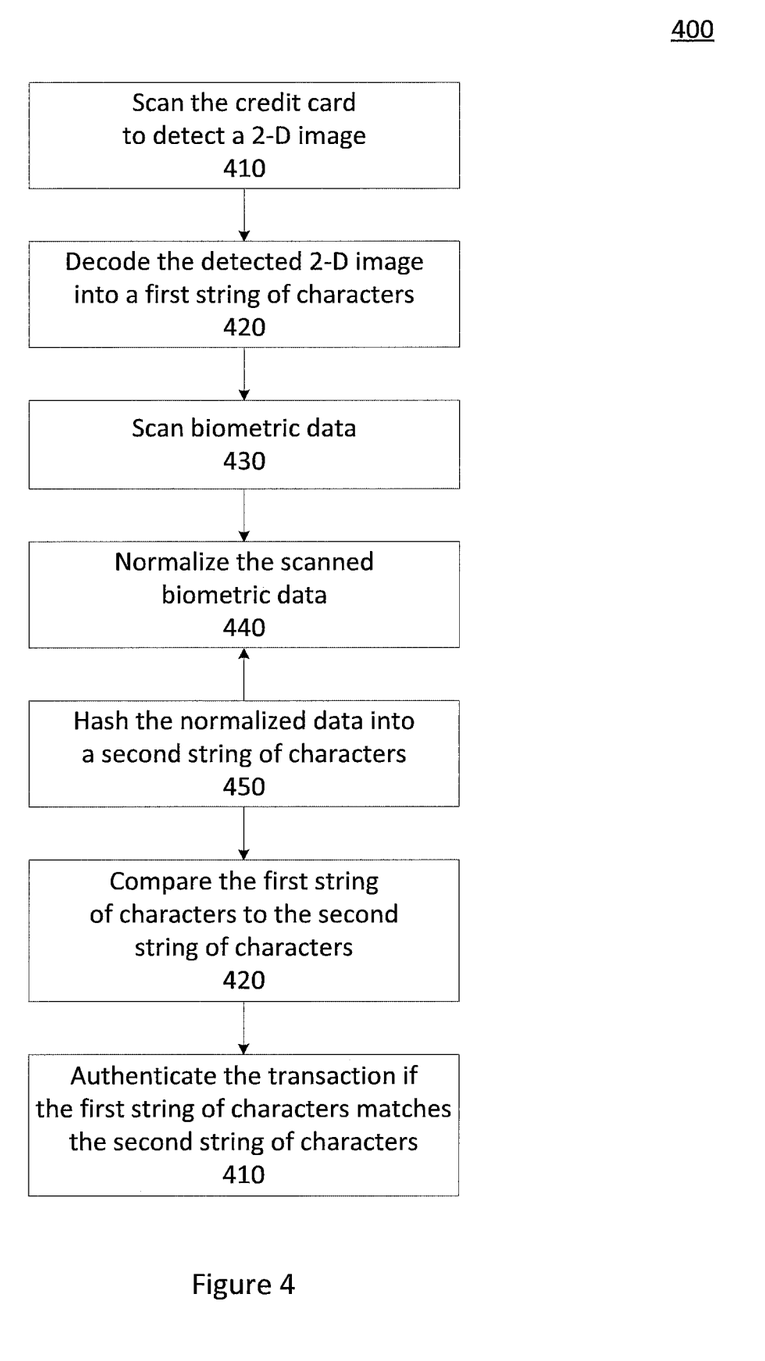
FIG. 4 illustrates an exemplary process 400 for authenticating a cardholder based on the 2-D image.

The image, when printed on a credit card, is scan-able by a machine at a merchant's terminal. FIG. 4 illustrates an exemplary process 400 for authenticating a cardholder based on the 2-D image printed on a credit card that is presented for payment. When a cardholder attempts to make a purchase using a credit card, the credit card presented by the cardholder may be inserted into a device similar to that of an EMV chip readers. Once inserted into the reader, the credit card is then scanned to detect the 2-D image printed on the card, as shown in operation 410. The scanned 2-D image is then decoded into a first string of characters in operation 420. The decoding is performed by receiving the image printed on the credit card as an input and using the conversion algorithm described above to generate the first string of characters represented by the image. In other words, the reverse of the conversion algorithm described above is applied to decrypt the image into a string of characters.

At operation 430, the system scans biometric data. In this instance, the system may scan the face of the cardholder. For example, the merchant terminal may have a 3-D sensor device to capture a 3-D image of the cardholder's face. In the alternative embodiment where fingerprints are used instead of facial features, a fingerprint reader may be used to capture the fingerprint of the cardholder. The scanned biometric feature is then normalized after being received in operation 440. As discussed above, normalizing this data includes identifying distinctive features on the surface of a face, such as the contour of the eye sockets, nose, and chin, while stripping out noise. Normalization also helps minimize the effect of any changes in lighting between different captures of the face and can further enable identification of a face from different viewing angles.

Once the biometric feature has been normalized, the normalized data is hashed into a second string of characters in operation 450. As discussed above, the string of characters may represent a set of hash values, each one of the hash values being the result of hashing a subset of the set of minutiae from the 3D mapping of the face (or other biometric measurement). In one embodiment, localized triplets (or small sets) of "minutiae" (defined as a point of interest on the 3D mapping of the face, can be an eye, nose, mouth, wrinkle, dimple, any other detail) may be hashed to produce a set of several values representing the hash values of localized sets. Given a high enough percentage of correct hashes, a match may be determined. Each individual hash of a localized set of minutiae will be done with Locality-sensitive hashing, which aims to maximize the probability of a hashing "collision" for similar inputs. For example, given a universe of items 'U' that have a similarity function $\phi$: $U \times U \rightarrow [0,1]$, a Locality sensitive hashing scheme is a family of hash functions 'H' coupled with a probability distribution 'D' over the functions such that a function 'h' (an element of H) chosen according to 'D' satisfies the property that [the probability that $h(a)=h(b)]=\phi(a, b)$, for any a, b in U.

In operation 460, the second string of characters may then be compared to the first string of characters that was decoded from the image in operation 420. By comparing the first and second strings of characters, the system can determine if the scanned face corresponds to the 2-D image printed on the credit card. If the comparison indicates a match in operation 470, the purchase is permitted to proceed. Otherwise, the merchant terminal may decline the transaction until an alternate form of verification is provided.

Figure 5:
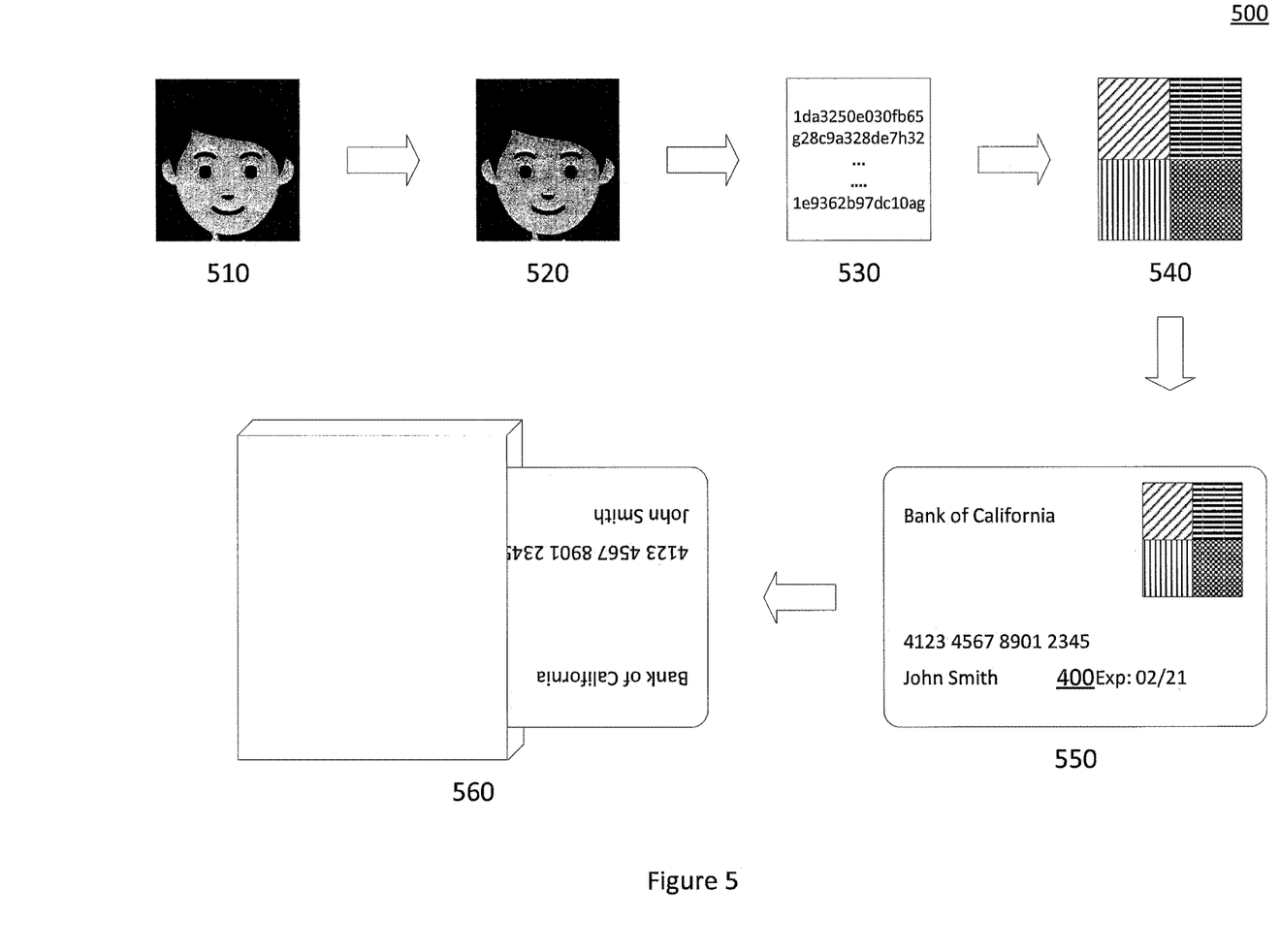
FIG. 5 provides a visual illustration of the exemplary process 300 for converting biometric data into a 2-D image for use in an authentication process.

FIG. 5 provides a visual illustration of the exemplary process 300 for converting biometric data into a 2-D image for use in an authentication process. In 510, biometric data is received. As shown in this example, facial features are provided to the system either from a database of scans or from a 3-D sensor that performs the scan. As discussed above, other biometric features such as fingerprints and middle ear scans may be scanned; however, for this example, facial features is used.

In 520, the biometric data is normalized after being received. The received biometric data may include information about the shape of a face captured by 3-D sensors. Normalizing this data includes identifying distinctive features on the surface of a face, such as the contour of the eye sockets, nose, and chin. Once normalized, the data can then be hashed into a string of characters, as shown in 530. The string of numbers can then be converted into a 2-D image using a conversion algorithm. As shown in 540, the 2-D image is a pattern in this example. Alternatively, the string of characters may be used as an input for an algorithm that alters a standard picture by adjusting certain features within the picture to produce a resulting image as discussed above.

Once the 2-D image has been created by the hash function, the image is provided for printing on a credit card as shown in 550. In this example, the pattern based image is printed in one quadrant on the face of the credit card. In some instances, there may be other designated areas on the credit card on which the image may be printed, e.g., top left corner of the card, or a predefined section of the card. Alternatively, the image may be printed on the entire face of the card. The image may be printed on the front and/or the back of the card. The card with the printed image may then be inserted into a scanner at a merchant's terminal as shown in 560.

Figure 6:
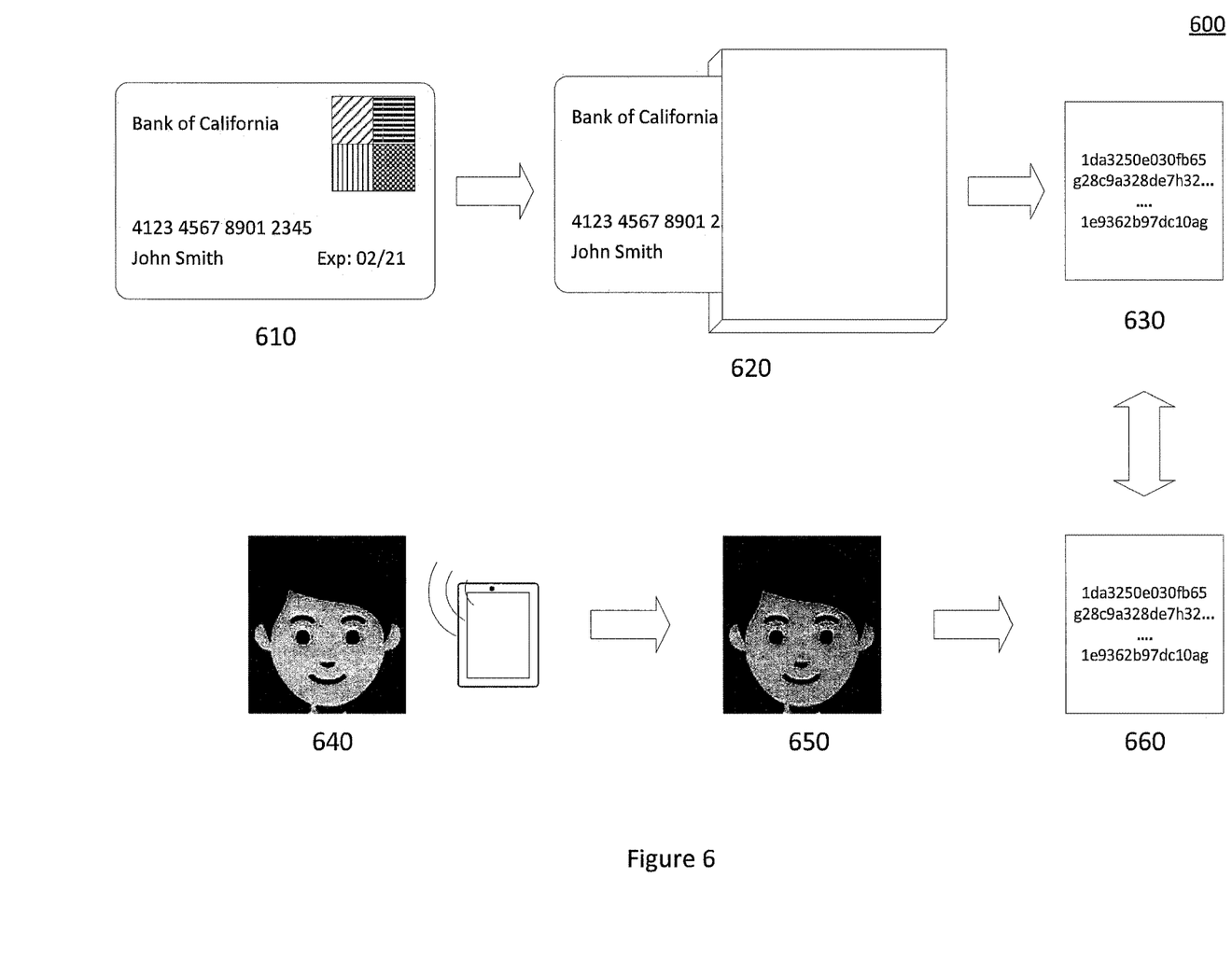
FIG. 6 provides a visual illustration of the exemplary process 400 for authenticating a cardholder based on the 2-D image.

FIG. 6 provides a visual illustration of the exemplary process 400 for authenticating a cardholder based on the 2-D image.

When a cardholder attempts to make a purchase, he presents his credit card presented to the merchant as shown in 610. In 620, the credit card is inserted into a card reader. Once inserted into the reader, the card reader scans the credit card in 630 to detect a 2-D image printed on the card. The scanned 2-D image is then decoded into a first string of characters in 630. The decoding is performed by receiving the image printed on the credit card as an input and using the conversion algorithm described above to generate the first string of characters represented by the image.

At or around the time when the card is inserted into the card reader, a scan of the cardholder's face is initiated in 640. The scan provides facial features to the system so that biometric features may be normalized after being received in 650. For example, the shape of a face captured by 3-D sensors may be normalized to identify distinctive features on the surface of a face and to minimize the effect of any changes in lighting. The normalized data is then hashed into a string of characters in 660 in the same manner as described above with regards to creating the image to be printed on the card. The string of characters derived from the face scan is then compared to the string of characters derived from the image on the credit card. When a match is determined, the transaction is allowed to be completed. If, however, a mismatch is determined, the system will either deny the transaction or prompt the merchant to obtain additional forms of authentication.

The user device (i.e., the computing device) described above may be one of a variety of devices including but not limited to a smartphone, a tablet, a laptop and a pair of augmented reality spectacles. Each of these devices embodies some processing capabilities and an ability to connect to a network (e.g., the internet, a LAN, a WAN, etc.). Each device also includes a display element for displaying a variety of information. The combination of these features (display element, processing capabilities and connectivity) on the mobile communications enables a user to perform a variety of essential and useful functions.

The foregoing description is provided to enable a person skilled in the art to practice the various configurations described herein. While the subject technology has been particularly described with reference to the various figures and configurations, it should be understood that these are for illustration purposes only and should not be taken as limiting the scope of the subject technology.

There may be many other ways to implement the subject technology. Various functions and elements described herein may be partitioned differently from those shown without departing from the scope of the subject technology. Various modifications to these configurations will be readily apparent to those skilled in the art, and generic principles defined herein may be applied to other configurations. Thus, many changes and modifications may be made to the subject technology, by one having ordinary skill in the art, without departing from the scope of the subject technology.

It is understood that the specific order or hierarchy of steps in the processes disclosed is an illustration of exemplary approaches. Based upon design preferences, it is understood that the specific order or hierarchy of steps in the processes may be rearranged. Some of the steps may be performed simultaneously. The accompanying method claims present elements of the various steps in a sample order, and are not meant to be limited to the specific order or hierarchy presented.

A phrase such as "an aspect" does not imply that such aspect is essential to the subject technology or that such aspect applies to all configurations of the subject technology. A disclosure relating to an aspect may apply to all configurations, or one or more configurations. An aspect may provide one or more examples of the disclosure. A phrase such as an "aspect" may refer to one or more aspects and vice versa. A phrase such as an "implementation" does not imply that such implementation is essential to the subject technology or that such implementation applies to all configurations of the subject technology. A disclosure relating to an implementation may apply to all implementations, or one or more implementations. An implementation may provide one or more examples of the disclosure. A phrase such an "implementation" may refer to one or more implementations and vice versa. A phrase such as a "configuration" does not imply that such configuration is essential to the subject technology or that such configuration applies to all configurations of the subject technology. A disclosure relating to a configuration may apply to all configurations, or one or more configurations. A configuration may provide one or more examples of the disclosure. A phrase such as a "configuration" may refer to one or more configurations and vice versa.

Furthermore, to the extent that the terms "include," "have," and "the like" are used in the description or the claims, such terms are intended to be inclusive in a manner similar to the term "comprise" as "comprise" is interpreted when employed as a transitional word in a claim.

The word "exemplary" is used herein to mean "serving as an example, instance, or illustration." Any implementation described herein as "exemplary" is not necessarily to be construed as preferred or advantageous over other implementations.

A reference to an element in the singular is not intended to mean "one and only one" unless specifically stated, but rather "one or more." The term "some" refers to one or more. All structural and functional equivalents to the elements of the various configurations described throughout this disclosure that are known or later come to be known to those of ordinary skill in the art are expressly incorporated herein by reference and intended to be encompassed by the subject technology. Moreover, nothing disclosed herein is intended to be dedicated to the public regardless of whether such disclosure is explicitly recited in the above description.

What is claimed is:

1. A system for authenticating a user, comprising:
a non-transitory memory storing instructions; and
one or more hardware processors coupled to the non-transitory memory and configured to read the instructions from the non-transitory memory to cause the system to perform operations comprising:
receiving biometric data;
hashing the biometric data into a string of characters;
creating a two-dimensional (2-D) square image comprising a plurality of blocks, wherein:
each block of the plurality of blocks corresponds to a character of the hashed string of characters;
the plurality of blocks are arranged such that each block shares a side with each of at least two other blocks, the shared sides of the at least two other blocks being orthogonal to one another; and
each block of the plurality of blocks comprises a patterned square image; and
providing the 2-D square image for printing on a personal transaction card.

2. The system of claim 1, wherein the biometric data is a three-dimensional scan of facial features.

3. The system of claim 1, wherein the biometric data corresponds to a fingerprint.

4. The system of claim 1, wherein the operations further comprise normalizing the received biometric data,
wherein hashing the biometric data into the string of characters comprises hashing the normalized biometric data into the string of characters.

5. The system of claim 4, wherein the normalizing the received biometric data comprises:
identifying at least a portion of features of the biometric data; and
filtering out noise from the biometric data based on the identifying.

6. The system of claim 1, wherein an algorithm that converts each character of the string of characters into a block is used to create the 2-D square image.

7. The system of claim 1, wherein creating the 2-D square image comprises:
receiving a selection of an image; and
altering a set of characteristics of the image based on the string of characters.

8. The system of claim 7, wherein altering the set of characteristics of the image comprises changing a set of pixels of the image.

9. The system of claim 1, wherein the personal transaction card is a credit card.

10. A method comprising:
scanning a personal transaction card to detect a 2-D square image comprising a plurality of blocks, wherein:
each block of the plurality of blocks comprises a patterned square image; and
the plurality of blocks are arranged such that each block shares a side with each of at least two other blocks, the shared sides of the at least two other blocks being orthogonal to one another;
decoding the plurality of blocks defining the 2-D square image into a first string of characters, wherein each block of the plurality of block corresponds to a character of the first string of characters;
scanning biometric data of a user;
hashing the scanned biometric data into a second string of characters;
comparing the first string of characters to the second string of characters;

determining a match between the first and the second strings of characters; and authenticating the user for use of the personal transaction card in response to the determining the match between the first and the second strings of characters.

11. The method of claim 10, wherein the biometric data is scanned as three-dimensional (3-D) facial features.

12. The method of claim 10, further comprising normalizing the scanned biometric data, wherein hashing the biometric data into the second string of characters comprises hashing the normalized biometric data into the second string of characters.

13. The method of claim 12, wherein the normalizing the scanned biometric data comprises:

identifying certain features of the biometric data; and filtering out noise from the biometric data based on the identifying.

14. The method of claim 10, wherein the personal transaction card is scanned by a card reader, and wherein the biometric data is scanned by a 3-D sensor device.

15. The method of claim 10, wherein the first string of characters comprises a hexadecimal string.

16. The method of claim 11, wherein the 3-D facial features include one or more of an eye, a nose, a mouth, a wrinkle, or a dimple.

17. The method of claim 10, wherein the personal transaction card is a credit card.

18. A non-transitory machine-readable medium having stored thereon machine-readable instructions executable to cause performance of operations comprising:

receiving biometric data corresponding to a scan of facial features of an individual;

normalizing the received biometric data;

hashing the normalized biometric data into a string of characters;

creating a 2-D square image comprising a plurality of blocks, wherein:

each block of the plurality of blocks corresponds to a character of the hashed string of characters;

the plurality of blocks are arranged such that each block shares a side with each of at least two other blocks, the shared sides of the at least two other blocks being orthogonal to one another; and each block of the plurality of blocks comprises a patterned square image; and providing the 2-D square image that causes a printing of the 2-D square image on a personal transaction card.

19. The non-transitory machine-readable medium of claim 18, wherein the 2-D square image, when printed on the personal transaction card and scanned by a card reader, is revertible into the string of characters.

20. The non-transitory machine-readable medium of claim 19, wherein the string of characters is a first string of characters, and wherein a user in a transaction is authenticated by:

scanning 3-D facial features of the user;

hashing the 3-D facial features into a second string of characters;

comparing the first string of characters to the second string of characters; and determining a match between the first and second strings of characters.

* * * * *